United States Patent [19]
Katoh et al.

[11] Patent Number: 5,666,266
[45] Date of Patent: Sep. 9, 1997

[54] INSTALLATION/REMOVAL STRUCTURE FOR A DEVICE FOR AN INFORMATION PROCESSING APPARATUS

[75] Inventors: Katsutoshi Katoh, Tokyo-to; Takehiko Noguchi, Yokohama; Tetsuya Ohtani, Yokohama; Michio Suzuki, Yokohama; Yoshiharu Uchiyama, Isehara, all of Japan

[73] Assignee: International Business Machines Corporation, Armonk, N.Y.

[21] Appl. No.: 277,926

[22] Filed: Jul. 20, 1994

[30] Foreign Application Priority Data

Jul. 21, 1993 [JP] Japan .................... 5-180396

[51] Int. Cl.$^6$ .................... G06F 1/16; H05K 7/12
[52] U.S. Cl. .................... 361/684; 361/685
[58] Field of Search .................... 364/708.1; 361/680, 361/685, 684

[56] References Cited

U.S. PATENT DOCUMENTS 5,402,309   3/1995   Ohgami et al. .................... 361/685

OTHER PUBLICATIONS

IBM Technical Disclosure Bulletin, vol. 29, No. 8, pp. 3491 and 3492, dated Jan. 1987, "Access Method For Feature Expansion" Jan. 1987.

Primary Examiner—Michael W. Phillips
Attorney, Agent, or Firm—Martin McKinley; Andrew J. Dillon

[57] ABSTRACT

An installation/removal structure for use with a generally rectangular peripheral device which may be temporarily installed within a portable data processing system. An engagement structure is provided within an interior portion of the portable data processing system and an electrical connector is mounted proximate to the engagement structure within the portable data processing system. An elongate flexible wire bail is swingably mounted across one end of the peripheral device, such that the elongate flexible wire bail can be engaged with the engagement structure by swinging the bail to a first position such that the peripheral device is held in electrical engagement with the electrical connector and when swung to a second position disengages from the engagement structure and may be utilized to remove the peripheral device from the portable data processing system.

3 Claims, 9 Drawing Sheets

INSTALLATION/REMOVAL STRUCTURE FOR A DEVICE FOR AN INFORMATION PROCESSING APPARATUS

BACKGROUND OF THE INVENTION

1. Technical Field

The present invention relates to an installation/removal structure for a device for installing or removing devices, that are usable in an information processing apparatus.

2. Description of the Related Art

There are various types of personal computers, which include portable computers. Currently, so-called notebook-type personal computers, which are portable and are therefore convenient, are widely used. Hereinafter, a description will be given of prior art by using this type of personal computer as an example.

Various important devices such as a floppy disk drive device, a battery, and a hard disk drive device are manufactured as "packs" and are incorporated within such a personal computer. However, conventionally, it has been assumed that such devices would not be installed and removed by an ordinary user. Recently, as needs of users have changed, there has been a trend toward constructions in which such devices can be installed and removed as occasion demands, and how installation/removal structures for these devices should be constructed has become a matter of interest.

The following is a conceptual explanation of conventional installation/removal structures. The conventional structure is provided with an operating means that is operated by a user (e.g., a lever provided at an outer portion of the processing apparatus main body), and a fixing means which is composed of a plurality of parts and which is used for fixing the devices to the interior of the processing apparatus main body. When a device is installed in the interior of the processing apparatus main body, the device is inserted from an insertion opening. When the device is removed from the interior of the processing apparatus main body, the user operates the operating means so that the device is removed from the insertion opening.

When such operating means and fixing means are provided for each device that may be installed in and removed from a processing apparatus, space for the necessary elements of the respective means must be reserved for each of the devices, which is extremely difficult and complicates the structure. This is particularly undesirable in notebook-type personal computers whose most distinctive feature is the fact that they are thin and light weight.

SUMMARY OF THE INVENTION

In view of the aforementioned, an object of the present invention is to provide a installation/removal structure for a device for an information processing apparatus which is structured simply and which enables the installation and removal of a device in an information processing apparatus. According to the present invention, an installation/removal structure for a device for an information processing apparatus is disclosed. The structure includes: engaging means provided at an interior portion of a main body of an information processing apparatus and holding means, provided at the interior portion of the main body, for holding a device, which can be used in the information processing apparatus, in a temporarily installed state. Further a swinging means is provided at the device so as to be swingable, the swinging means engages with the engaging means by swinging at a time when the device is held by the holding means. A state of engagement of the engaging means and the swinging means is canceled by the swinging means swinging in a direction opposite to a direction in which the swinging means swings into engagement with the engaging means.

The information processing apparatus typically is constructed with a thin main body having an opening in a surface thereof, an accommodating space for accommodating the device being provided in an interior portion of the main body. A board is further provided with an inputting means. The board is operated so as to be set in one of a closing state, in which the board closes the opening, and an opening state, in which the opening is open. Also, a cover is provided with a display in a reverse surface thereof. The cover opens and closes so as to be set in one of a revealing state, in which a surface of the board is revealed, and a concealing state, in which the surface the board is concealed.

The swinging means engages with the engaging means due to elastic deformation of the engaging means or of the swinging means or of the engaging means and the swinging means.

Additionally, preventing means are provided for preventing elastic deformation of the engaging means or of the swinging means or of the engaging means and the swinging means when an external force is applied to the device in a direction of removing the device from the main body in a state in which the swinging means is engaged with the engaging means.

When a device, which can be used in an information processing apparatus, is installed within the main body of the information processing apparatus, first, the device is held by the holding means. In this state, the device is in a temporarily installed state within the main body. Next, in this state, the swinging means provided at the device is swung so as to engage with the engaging means. As a result, the device is reliably installed within the main body.

On the other hand, when the device is to be removed from the interior of the main body, first, the swinging means is swung in the direction opposite to the direction in which it is swung in the above-described swinging operation. Accordingly, the engaged state of the swinging means and the engaging means is released. Because the device is in the temporarily installed state, the device can be removed from the interior of the main body.

In the present invention, the swinging means, which is operated during removal and installation operations (and may therefore be referred to as an "operating means"), also functions to engage with the engaging means (and may therefore be referred to as an "engaged means"). Accordingly, due to the swinging means and the engaging means, the device can reliably be installed within the main body. Therefore, as compared with a case in which the function of the operating means and the function of the engaged means are provided independently by separate parts, the number of parts can be reduced. Accordingly, the installation/removal structure can be simplified, and the space occupied by parts can be decreased.

When a device is to be installed in the main body, first, the cover is opened. The board, which is set in the closing state in which the board covers the opening of the main body, is thereby exposed. Next, the board is operated so as to be set in the opening state in which the opening of the main body is open. Accordingly, the device is set in the interior of the main body in a temporarily installed state. Subsequently, in this state, the swinging means provided at the device is swung so as to engage with the engaging means. As a result, the device is reliably installed within the main body.

On the other hand, when the device is to be removed from the interior of the main body, in the same way as described above, the cover is opened and the board is operated so as to be set in the opening state in which the opening is open. In this way, the interior portion of the main body is revealed. Next, the swinging means is swung in a direction opposite to the direction at the time of the swinging operation. The engagement of the swinging means and the engaging means is thereby released. As a result, the device is set in the temporarily installed state and can therefore be removed from the interior of the main body.

Since the main body of the information processing apparatus of the present invention is thin and it is difficult to reserve space for various parts, an excellent effect is achieved in that the number of parts can be reduced and the structure can simplified. Further, by decreasing the number of parts, the main body can be made more compact and more light-weight, and consequently, the entire information processing apparatus can be made more compact and more light-weight.

Further, the swinging means engages the engaging means due to the elastic deformation of the engaging means or of the swinging means, or of the engaging means and the swinging means. Therefore, if, for example, a structure which uses resin parts and which is elastically deformed is utilized as the engaging means, the engaging means can be formed integrally with other parts made of resin (for example, the main body) when these other parts are manufactured. Accordingly, as compared with a structure in which a separate part is used and is assembled independently into the main body, there are advantages such as the number of assembly steps can be reduced and the like.

When an external force is applied to a device in the direction of removing the device from the main body while the swinging means is engaged with the engaging means, if, for example, the engaging means is the only main element to elastically deform, the force will be applied to the engaging means so as to elastically deform the engaging means. However, in the present invention, in such a case, elastic deformation of the engaging means is prevented by the preventing means. Accordingly, the installed state of the device within the main body is even more secure. The preventing means functions similarly in a case in which only the swinging means elastically deforms or in a case in which both the swinging means and the engaging means elastically deform.

The above as well as additional objectives, features, and advantages of the present invention will become apparent in the following detailed written description.

DETAILED DESCRIPTION OF PREFERRED EMBODIMENT

An embodiment of the present invention will be described with reference to FIGS. 1 through 12. FIG. 7 is a perspective view illustrating the exterior of a notebook-type personal computer 10 relating to the present embodiment in a state of use thereof. The overall structure of the personal computer 10 will be described hereinafter with reference to this figure.

The personal computer 10 relating to the present embodiment includes a thin main body 12 and a cover 14 provided so as to be openable and closable with respect to the main body 12.

The main body 12 is provided with a case 16 having a shallow bottom. A supporting plate 18 of a predetermined width is mounted to the rear side of an edge of an open portion of the case 16. A keyboard 20 is provided at the front side of the edge of the open portion of the case 16. A pair of tongue-shaped protrusions 22 are formed integrally with the keyboard 20 at the rear edge portion thereof. The pair of protrusions 22 are axially supported by the front edge portion of the supporting plate 18 so that the keyboard 20 is hinge-connected to the supporting plate 18. Accordingly, the keyboard 20 can be pivoted around the pair of protrusions 22.

The cover 14 is also provided with a shallow-bottom (double-bottom) case 24. A liquid crystal display 26 is provided in the center of the open side, i.e., the reverse side, of the case 24. A pair of cylindrical protrusions 28 are formed integrally with the case 24 at the lower edge portion thereof. The pair of protrusions 28 are axially supported at the rear edge portion of the supporting plate 18 of the main body 12 so that the cover 14 is hinge-connected to the main body 12. Accordingly, the cover 14 can be pivoted around the pair of protrusions 28.

The opening and closing of the cover 14 with respect to the main body 12 and the opening and closing of the keyboard 20 with respect to the case 16 of the main body 12 are effected by operation of an opening/closing operation portion 30 (operated in two stages) provided at a side portion of the case 16.

Figure 6:
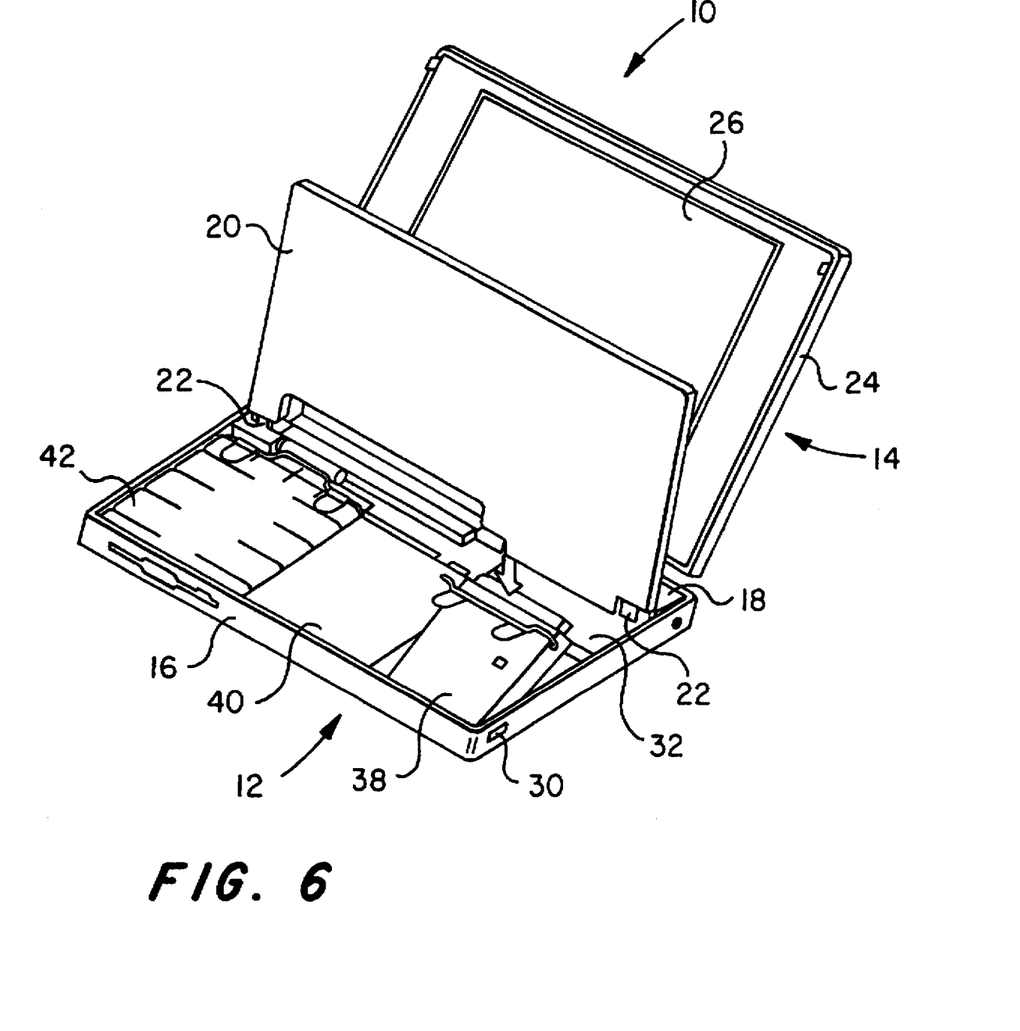
FIG. 6 is an external perspective view illustrating the personal computer relating to the present embodiment with a keyboard in an opening state.
Figure 7:
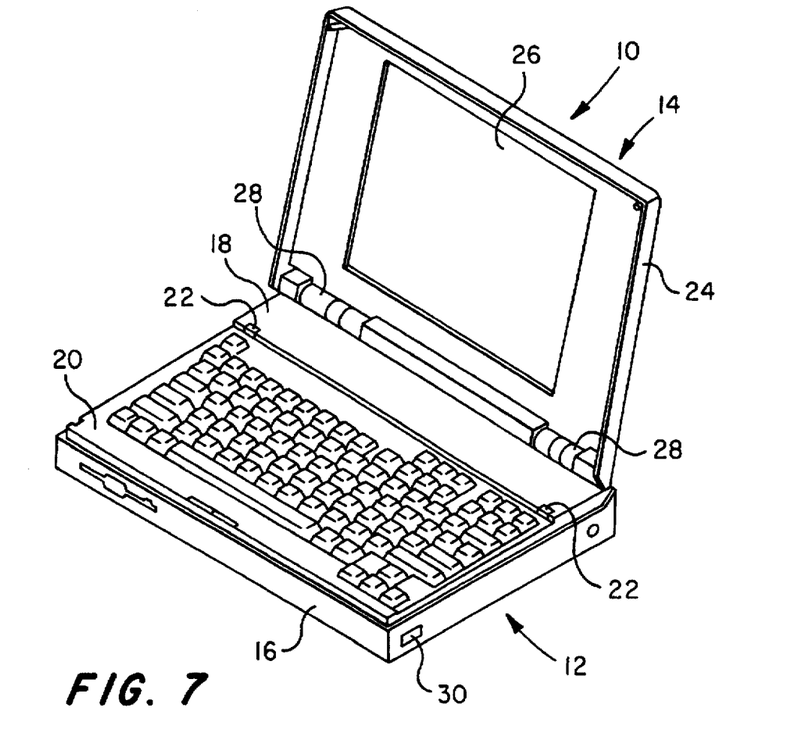
FIG. 7 is an external perspective view illustrating the personal computer shown in FIG. 6 with the keyboard in a closing state.
Figure 8:
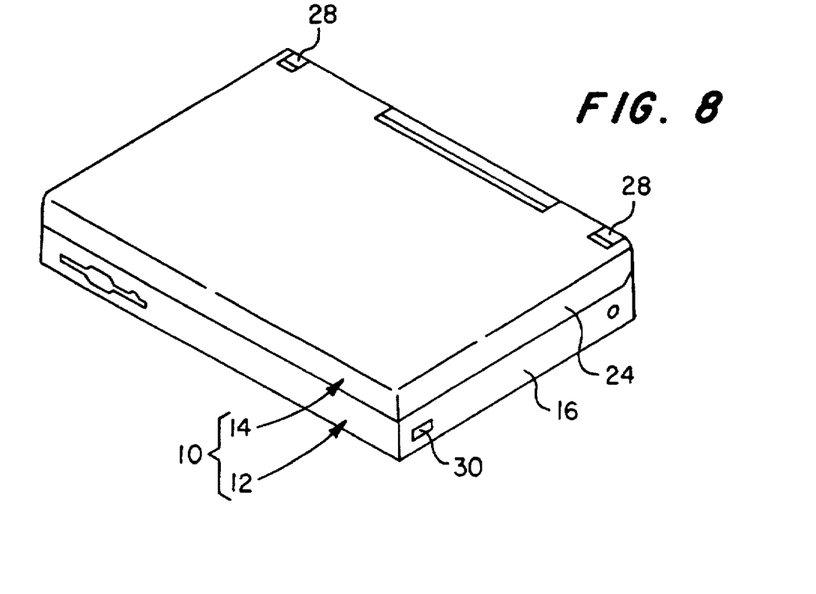
FIG. 8 is an external perspective view illustrating the personal computer shown in FIG. 7 in a state in which a cover is closed.
Figure 9:
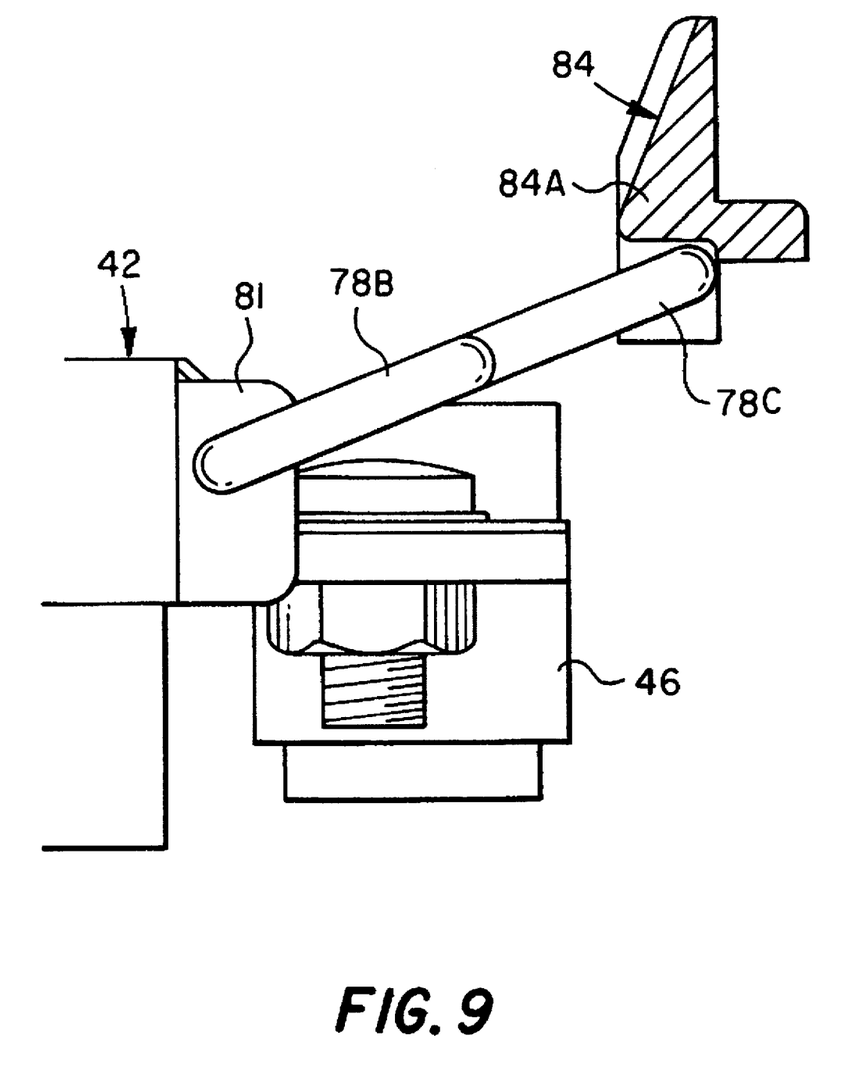
FIG. 9 is a expanded side view (partially in cross section) of main portions and illustrates an installation/removal structure of an FDD pack.
Figure 10:
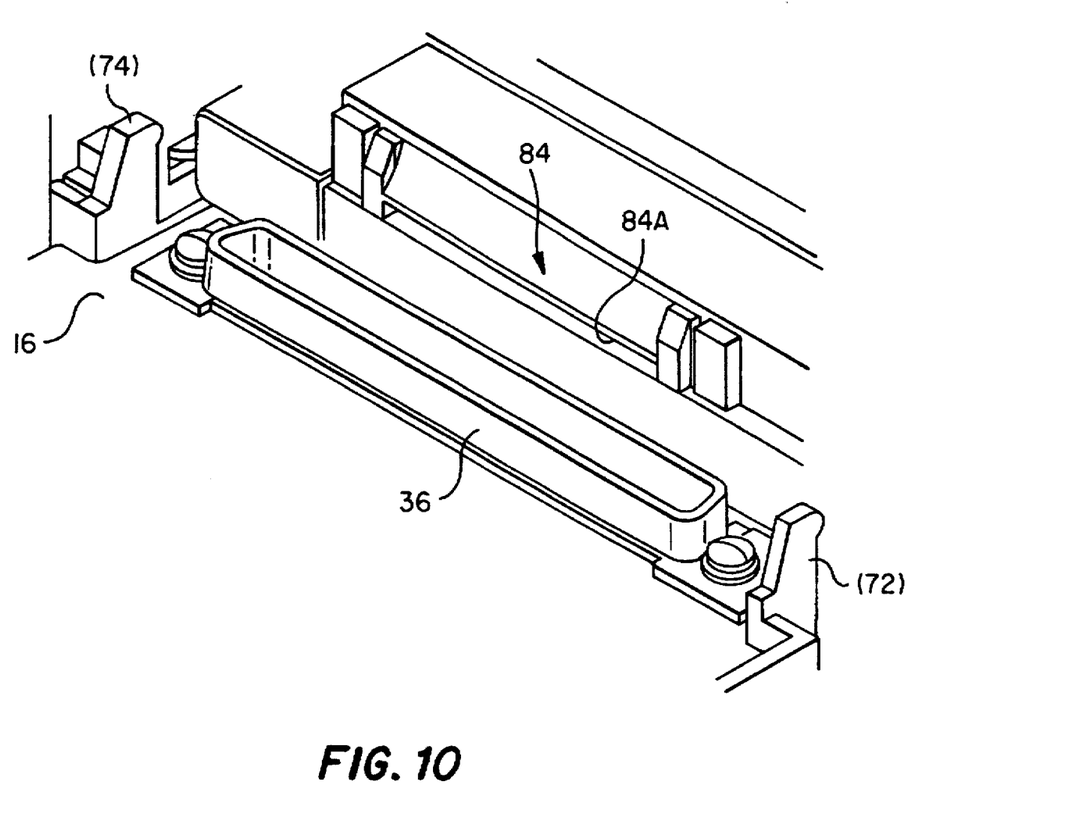
FIG. 10 is an expanded perspective view illustrating an engaging convex portion and the like for installation and removal of the FDD pack.

In FIG. 6, the personal computer 10 is illustrated with the keyboard 20 being set in the opening state. Hereinafter, the internal structural parts of the main body 12 of the personal computer 10 will be briefly be described with reference to this figure.

A partitioning wall 32, which is formed by a thin metal plate being bent into a predetermined configuration, is disposed at the rear side of the interior of the case 16 of the main body 12. An unillustrated system main body, which includes a CPU (central processing unit), or the like, is disposed within this partitioning wall 32. A connector 34 for an HDD (hard disk drive device) pack (see FIG. 5), a terminal for a battery pack (unillustrated), and a connector 36 for an FDD (floppy disk drive device) pack (see FIG. 11) are disposed at the front edge portion of the partitioning wall 32.

An HDD pack 38, a battery pack 40 and an FDD pack 42 are installed at the front side of the interior of the case 16 of the main body 12. Namely, the HDD pack 38 is provided with a system main body connector 44 (see FIG. 4 which is connected to the HDD pack connector 34. Likewise, the FDD pack 42 is provided with a system main body connector 46 (see FIG. 9), which is connected to the FDD pack connector 36. Further, the battery pack 40 is provided with a system main body terminal (not illustrated) that contacts and is connected to the battery pack terminal.

Next, the structure of the HDD pack 38 and an installation/removal structure for the HDD pack 38 will be described.

Figure 5:
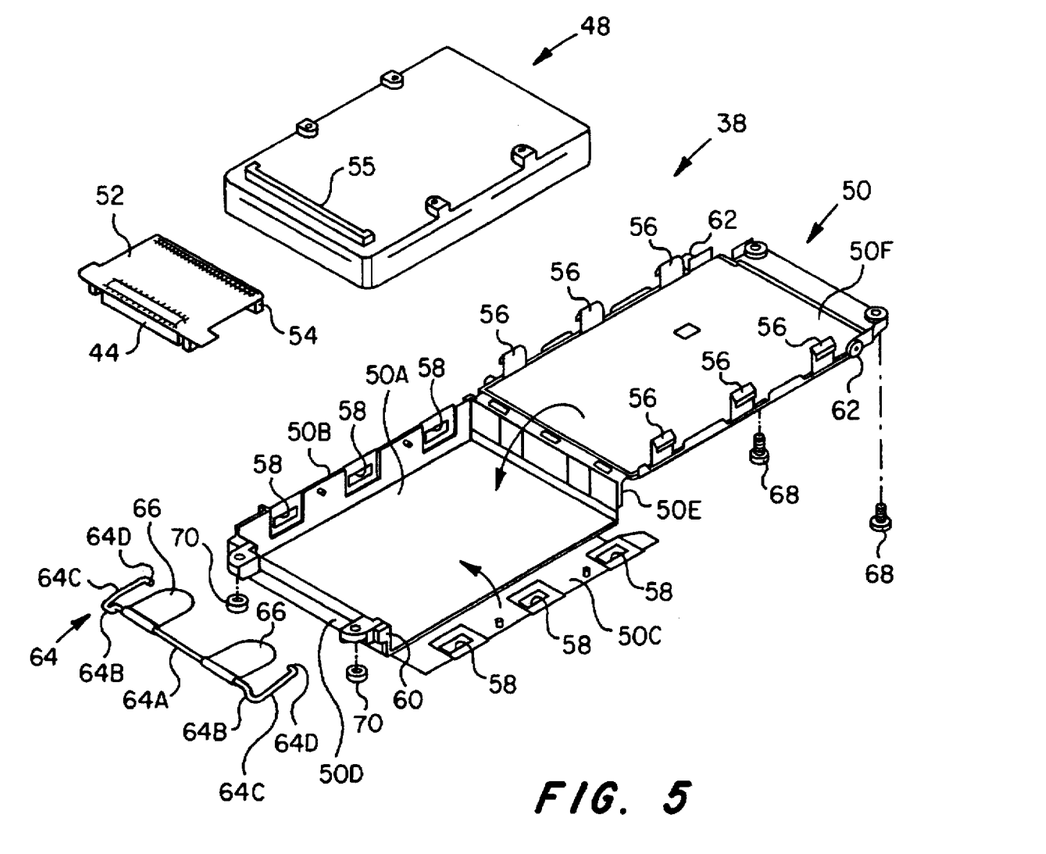
FIG. 5 is an exploded perspective view of the HDD pack illustrated in FIG. 4.

As illustrated in FIG. 5, the HDD pack 38 includes an HDD main body 48 and an accommodating case 50. A flexible substrate 52, which is formed of a resin material and is shaped as a rectangular, flat plate, is mounted to the HDD main body 48. An HDD main body connector 54 is attached to one edge portion of the flexible substrate 52. The system main body connector 44 is attached to another edge portion of the flexible substrate 52. The HDD main body connector 54 is connected to a connector 55 disposed on the top surface of the HDD main body 48 at the front edge portion thereof.

The accommodating case 50 is formed of resin material and is formed by a bottom wall 50A, a pair of side walls 50B, 50C, a front edge wall 50D, a rear edge wall 50E and a top wall 50F. The side wall 50B, the front edge wall 50D and the rear edge wall 50E do not pivot with respect to the bottom wall 50A. However, the side wall 50C and the top wall 50F are connected by resin hinges to the bottom wall 50A and the rear edge wall 50E, respectively, so as to be pivotable with respect thereto. Further, a plurality of pawls 56 are formed at both edge portions of the top wall 50F so as to project vertically. A plurality of rectangular openings 58 are formed at the pair of side walls 50B, 50C so as to correspond to the plurality of pawls 56. Further, pawls (not designated by any reference numeral), which can engage with each other, are formed at the front and rear edges of the side wall 50C and at respective edge portions of the front edge wall 50D and the rear edge wall 50E.

A pair of positioning projections 60 are provided at the respective sides of the front edge wall 50D. The purpose of the pair of positioning projections 60 will be described later. A pair of supporting protrusions 62, each having a small hole formed in the axially central portion thereof, is formed coaxially at the front edge portion of the top wall 50F. A wire 64 engages these supporting protrusions 62. The wire 64 is formed of a straight line portion 64A, a pair of engaged portions 64B, a pair of bent portions 64C, and a pair of insertion portions 64D. The engaged portions 64B are bent in angular configurations from the respective end portions of the straight line portion 64A. The bent portions 64C are formed so as to be bent from the pair of engaged portions 64B and so as to be parallel to each other. The insertion portions 64D are formed so as to be bent from the pair of bent portions 64C in directions of approaching each other. A pair of tapes 66 (not illustrated in FIGS. 1 and 2) is adhered to sides of the straight line portion 64A.

Due to the above-described structure, the HDD main body 48 can be accommodated within the accommodating case 50 by the following processes. First, the HDD main body 48 is set on the bottom wall 50A of the accommodating case 50. At this time, the HDD main body connector 54 of the flexible substrate 52 is already connected to the connector 55 of the HDD main body 48. When the HDD main body 48 is set on the bottom wall 50A, a portion of the flexible substrate 52 in a vicinity of the HDD main body connector 54 is folded down and an intermediate portion of the flexible substrate 52 is folded up 180° so that the folded-down portion and the folded-up portion of the flexible substrate 52 contact each other. Thereafter, a portion of the flexible substrate 52 in a vicinity of the system main body connector 44 is folded 90°. As a result, the HDD main body connector 54 is oriented toward the rear edge wall 50E, whereas the system main body connector 44 is oriented toward the bottom wall 50A (i.e., the HDD main body connector 54 and the system main body connector 44 are orthogonal to each other). Next, after the side wall 50C is folded so as to engage with the front edge wall 50D and the rear edge wall 50E, the top wall 50F is folded so that the pawls 56 engage with the edges of the openings 58. Thereafter, with both sides of the system main body connector 44 of the flexible substrate 52 held, the top wall 50F is screwed to the front edge wall 50D by screws 68 and nuts 70. Finally, the pair of insertion portions 64D of the wire 64 are engaged with the supporting protrusions 62 of the side walls 50B, 50C while being elastically deformed. In this way, the HDD pack 38 is structured such that the HDD main body 48, which is an ultraprecise part, is protected by the accommodating case 50 which is formed by a single resin part (see FIG. 4).

The structure for installing/removing the HDD pack 38 is formed by the wire 64 and by a pair of engaging projections 72, 74 provided on the case 16 of the main body 12. Because the former structure has already been explained, only the latter structure will be described hereinafter.

Figure 3A:
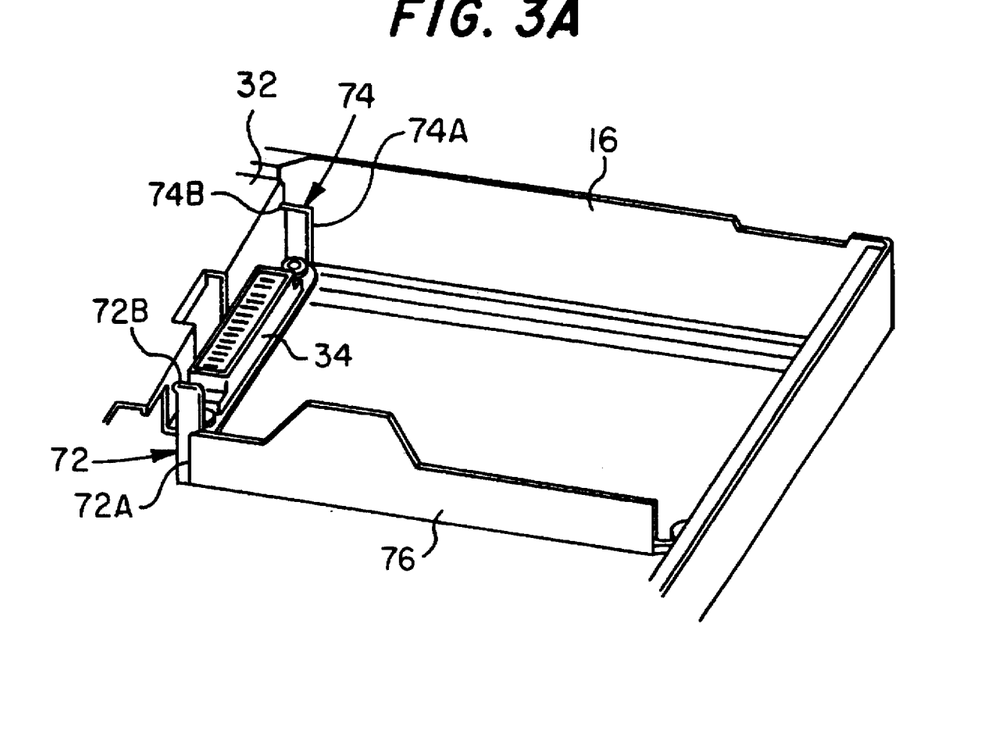
FIG. 3A is a perspective view illustrating the case of the main body illustrated in FIG. 1 in a state in which the HDD pack has not yet been installed.
Figure 3B:
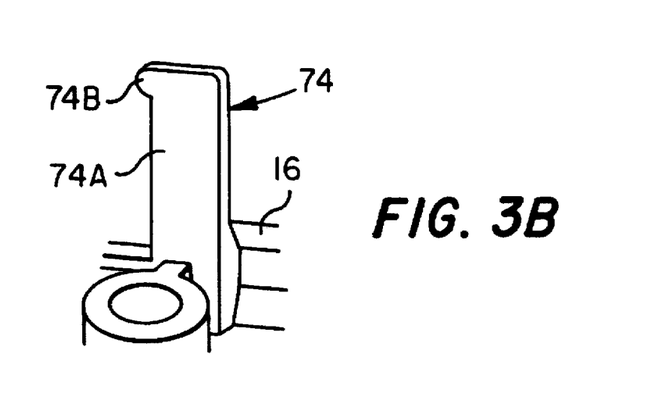
FIG. 3B is an enlarged perspective view of main portions in which one of the engaging projections is enlarged.
Figure 4:
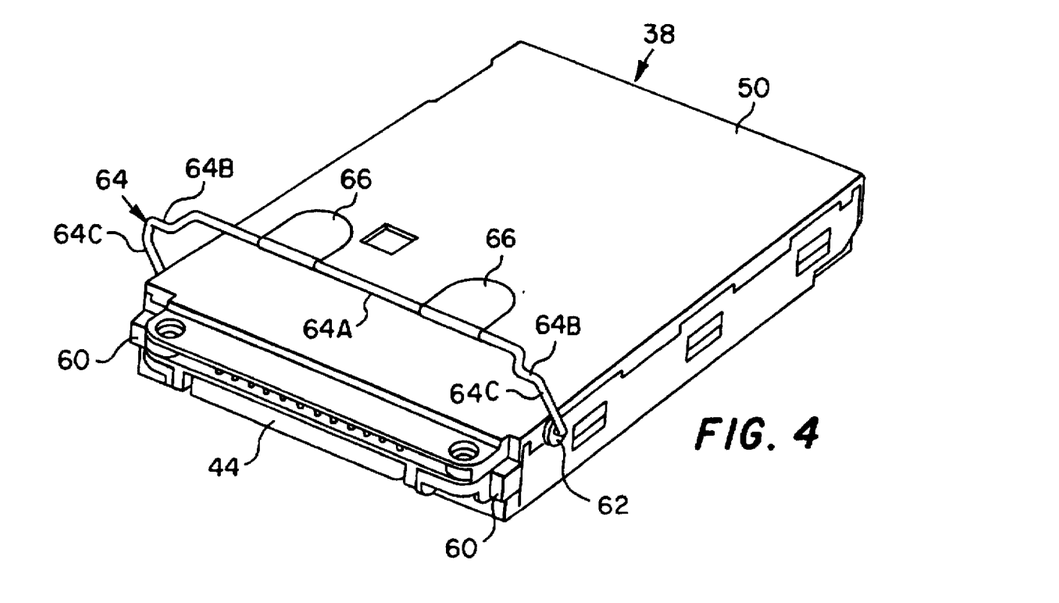
FIG. 4 is a perspective view illustrating the HDD pack of FIG. 1 as a unit.

As illustrated in FIG. 3A, the pair of engaging projections 72, 74, which oppose each other in a vicinity of the partitioning wall 32 which covers the system main body, are formed upright at the case 16 of the main body 12. One of the engaging projections 72 is formed of a supporting portion 72A, which extends upright from the bottom surface of the case 16, and an engaging portion 72B, which projects from the upper end portion of the supporting portion 72A toward the partitioning wall 32 side. Similarly, the other engaging projection 74 is formed from a supporting portion 74A and an engaging portion 74B (illustrated in the expanded view in FIG. 3B).

The supporting portion 72A of the engaging projection 72 is formed integrally with the side wall of the case 16. The supporting portion 74A of the other engaging projection 74 is formed integrally with a dividing plate 76. Accordingly, both of the engaging projections 72, 74 have a predetermined supporting strength. The dividing plate 76 divides the installation space for the HDD pack 38 from the installation space for the battery pack 40.

Figure 1:
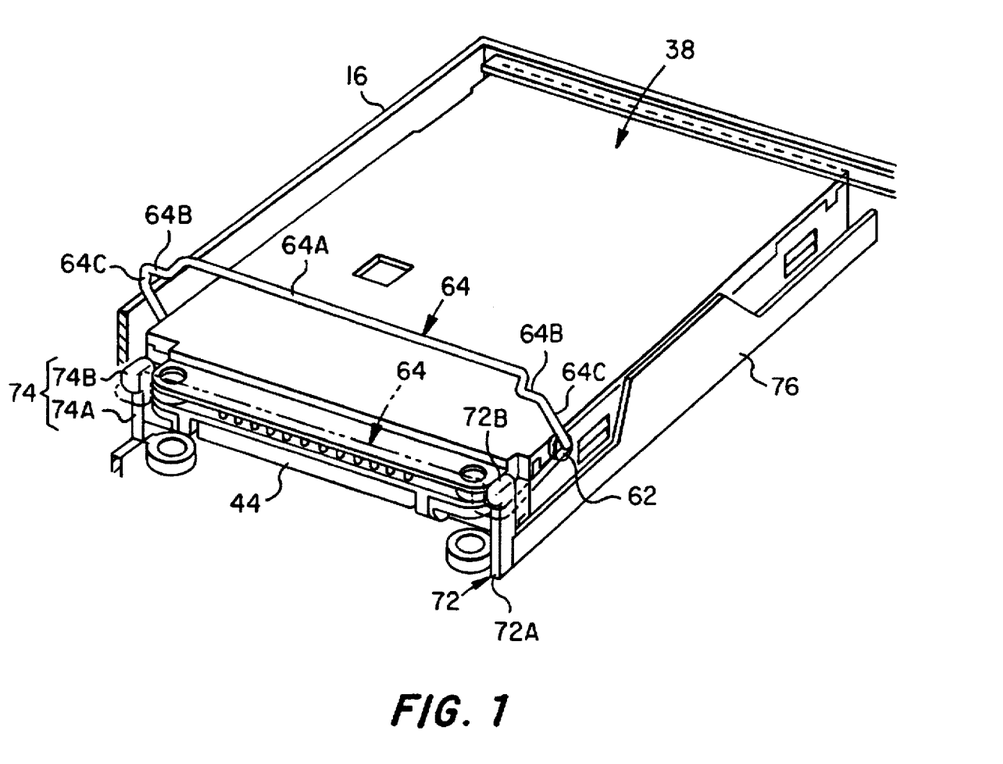
FIG. 1 is a perspective view illustrating a state in which an HDD pack is mounted within a case of a main body in a personal computer relating to the present embodiment.
Figure 2:
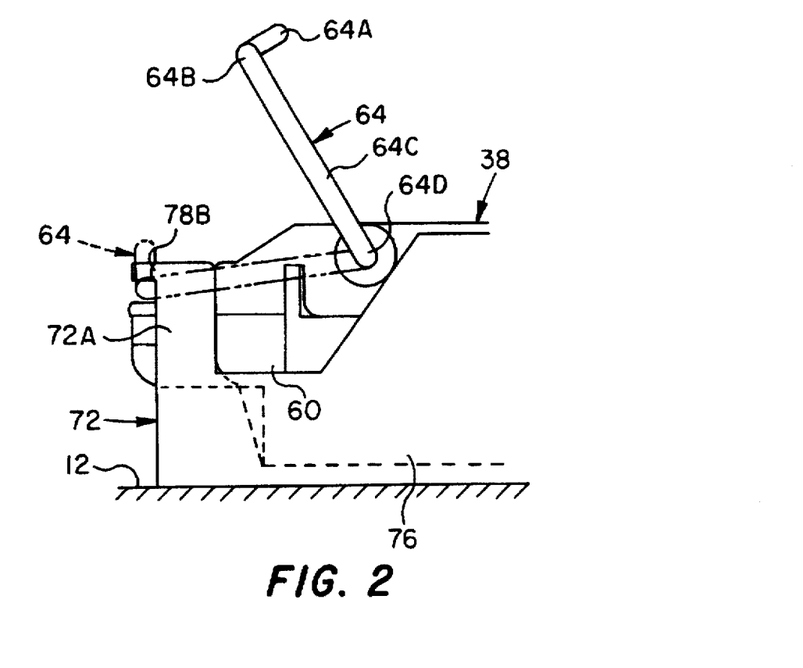
FIG. 2 is a partially enlarged side view illustrating a state in which a wire of the HDD pack illustrated in FIG. 1 is engaged with an engaging projection.

As illustrated in FIGS. 1 and 2, the amount of protrusion by which the engaging portions 72B, 74B of the engaging projections 72, 74 protrude from the supporting portions 72A, 72B is slight and is substantially the same as the diameter of the wire 64. Further, the respective heights of the engaging projections 72, 74 are slightly lower that the height of the HDD pack 38. More specifically, the heights of the engaging projections 72, 74 are determined such that the positions of the engaging portions 72B, 74B at the upper end portions of the engaging projections 72, 74 are slightly lower than the positions of the insertion portions 64D which are the center of swinging of the wire 64 (see FIG. 2). Accordingly, when the pair of engaged portions 64B of the wire 64 are engaged with the engaging portions 72B, 74B of the engaging projections 72, 74, the position at which the wire 64 is engaged with the engaging projections 72, 74 is slightly lower than the center of swinging of the wire 64.

Next, the installation/removal structure of the FDD pack 42 will be described.

Figure 12:
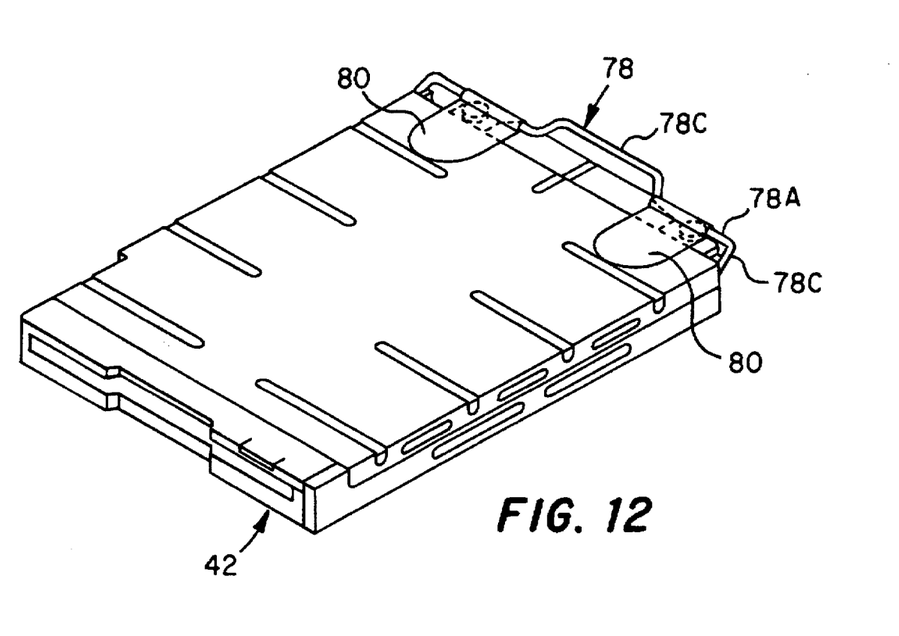
FIG. 12 is a perspective view illustrating the FDD pack as a unit.

As illustrated in FIG. 12, similarly to the HDD pack 38, a wire 78 is attached to the FDD pack 42; however, the configuration of the wire 78 differs from that of the wire 64. Namely, the wire 78 includes a straight line portion 78A and axially supported portions 78B formed so as to be bent in substantial U-shapes from the end portions of the straight line portion 78A. A pair of tapes 80 are adhered to the straight line portion 78A of the wire 78. The axially supported portions 78B of the wire 78 are axially supported by flanges 81 (see FIG. 9) formed on a case 82 provided at the FDD pack 42. An engaged portion 78C, whose axial line is bent in a crank shaft configuration, is provided at an intermediate portion of the straight line portion 78A of the wire 78. The straight line portion 78A of the wire 78 abuts the top surface of the FDD pack 42 and cannot be swung any further. Accordingly, the engaged portion 78c is oriented upwardly at an angle with respect to the top surface of the FDD pack 42 as long as the tapes 80 are not pinched and pulled.

Figure 11:
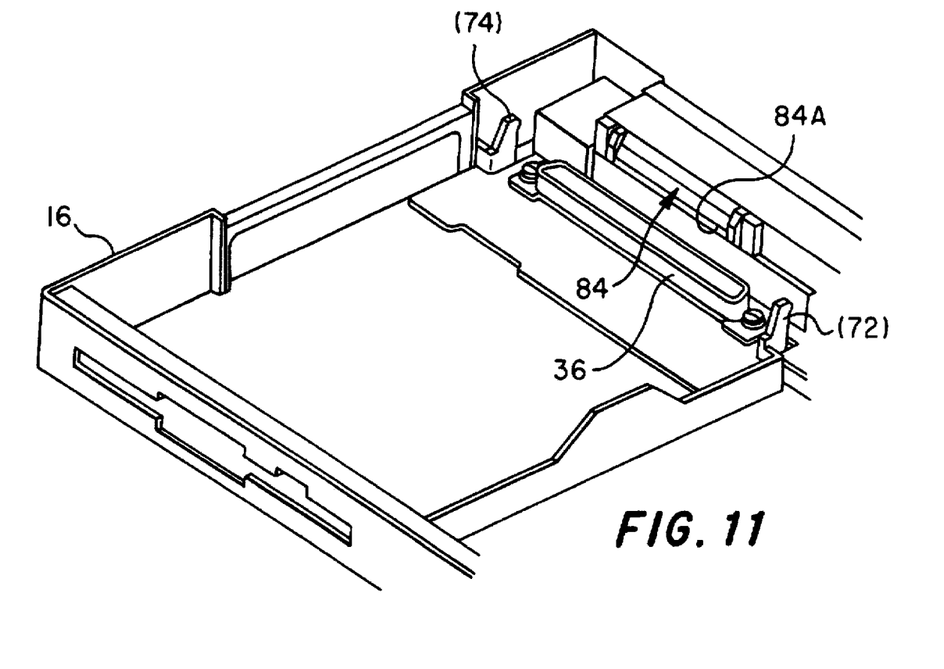
FIG. 11 is a perspective view illustrating a portion of the case of the main body to which the FDD pack is mounted.

Correspondingly, as illustrated in FIG. 11, an engaging convex portion 84 is formed at the front surface of the partitioning wall 32. As shown in the expanded view in FIG. 10, a jaw portion 84A is formed at the lower edge portion of the engaging convex portion 84. More specifically, when the wire 78 is swung around the axially supported portions 78B, the jaw portion 84A is positioned at a position which interferes with the locus of swinging of the engaged portion 78C. Accordingly, when the wire 78 is swung and the jaw portion 84A interferes with the engaged portion 78C, the engaged portion 78C elastically deforms so as to clear the jaw portion 84A and thereafter is engaged with the jaw portion 84C (see FIG. 9).

Hereinafter, operation of the present embodiment will be described by way of explanation of installation/removal operations of the HDD pack 38 and the FDD pack 42.

First, the opening/closing operation portion 30 is operated only one step. In this way, the engaged state of the case 16 of the main body 12 of the personal computer 10, which is not being used, and the case 24 of the cover 14 is canceled. (This state of the personal computer 10 corresponds to the state in FIG. 8 and the "concealing state"). Next, the cover 14 is pivoted around the pair of protrusions 28 in the direction of moving away from the main body 12 and is opened (the state in FIG. 7 corresponding to the "revealing state"). Subsequently, the second stage operation of the opening/closing operation portion 30 is effected so that the engaged state of the case 16 of the main body 12 and the keyboard 20 is released. Then, the keyboard 20 is pivoted around the pair of protrusions 22 in the direction of moving away from the case 16 so that the keyboard 20 is set in the opening state. The personal computer 10 is thereby set in the state illustrated in FIG. 6 in which the HDD pack 38 and the FDD pack 42 are revealed. At this point in time, the pair of engaged portions 64B of the wire 64 of the HDD pack 38 are engaged with the engaging portions 72B, 74B of the engaging projections 72, 74. Further, the engaged portion 78C of the wire 78 of the FDD pack 42 is engaged with the jaw portion 84A of the engaging convex portion 84.

Subsequently, operation for removing the HDD pack 38 from the case 16 of the main body 12 is effected. First, the pair of tapes 66 adhered to the wire 64 of the HDD pack 38 are pinched, and the wire 64 is swung around the supporting protrusions 62. In this way, the pair of engaged portions 64B of the wire 64 separate from the engaging portions 72B, 74B of the pair of engaging projections 72, 74. More specifically, the tensile force acting on the pair of tapes 66 acts, via the wire 64, on the regions of engagement of the pair of engaged portions 64B of the wire 64 and the engaging portions 72B, 74B of the pair of engaging projections 72, 74. Due to the elastic deformation of the engaging portions 72B, 74B, the engaged portions 64B separate from the engaging portions 72B, 74B. Thereafter, by pulling the tapes 66 even further, the system main body connector 44 of the HDD pack 38 is pulled out from the HDD pack connector 34 of the main body 12.

After the HDD pack 38 has been pulled out, a different type of HDD pack is installed (e.g., an HDD pack having an HDD main body which has a greater capacity than that of the HDD main body 48 of the HDD pack 38, or an HDD pack having an HDD main body which has functions other than those of the HDD main body 48, or the like). Further, the above-described removal operation is necessary in cases in which there is trouble with the HDD pack 38 which is being used or the like.

Operation at the time of installation is effected in the opposite order of the order of the operations described above. The following is a description of a case in which the removed HDD pack 38 is installed again. First, the system main body connector 44 of the HDD pack 38 is inserted into the HDD pack connector 34 of the main body 12. At this time, when the tip end surfaces of the respective positioning projections 60 of the HDD pack 38 abut the respective engaging projections 72, 74 corresponding thereto, the system main body connector 44 of the HDD pack 38 corresponds to the HDD pack connector 34 of the main body 12. The state in which the system main body connector 44 of the HDD pack 38 is inserted into the HDD pack connector 34 of the main body 12 corresponds to the "temporarily installed state" of the device within the main body. Next, the pair of tapes 66 of the wire 64 are pinched, and the wire 64 is swung around the supporting protrusions 62 in the direction opposite to the direction in the above-described case. The pair of engaged portions 64B of the wire 64 are engaged with the engaging portions 72B, 74B of the pair of engaging projections 72, 74. When the engaged portions 64B and the engaging portions 72B, 74B engage normally, a clicking sound can be heard, so that an ordinary user can ascertain that the engaged portions 64B and the engaging portions 72B, 74B have engaged normally. If the click is not heard, however, an ordinary user can recognize that the system main body connector 44 of the HDD pack 38 has not been inserted properly into the HDD pack connector 34 of the main body 12.

On the other hand, when the FDD pack 42 is removed from the case 16 of the main body 12, the following operations are effected. First, the pair of tapes 80 which are adhered to the wire 78 of the FDD pack 42 are pinched, and the wire 78 is swung around the flange 81 of the case 82 of the FDD pack 42. In this way, the engaged portion 78C of the wire 78 separates from the jaw portion 84A of the engaging convex portion 84. More specifically, the tensile force acting on the pair of tapes 80 acts, via the wire 78, on the region at which the engaged portion 78C of the wire 78 and the jaw portion 84A of the engaging convex portion 84 are engaged. Due to the elastic deformation of the engaged portion 78C of the wire 78 (accordingly, the relationship is the opposite of the case of installing/removing the HDD pack 38 in which the engaging portions 72B, 74B of the engaging projections 72, 74 are elastically deformed), the engaged portion 78C separates from the jaw portion 84A of the engaging convex portion 84. Thereafter, by pulling the pair of tapes 80 even further, the system main body connector 46 of the FDD pack 42 is pulled out from the FDD pack connector 36 of the main body 12.

After the FDD pack 42 has been pulled out, the same FDD pack 42 or a different type of FDD pack may be installed by carrying out operations in the reverse order of those described above.

In the above-described embodiment, the structure which enables the HDD pack 38 to be installed in and removed from the case 16 of the main body 12 includes the wire 64, which is attached to the HDD pack 38 so as to be swingable, and the pair of engaging projections 72, 74, which are provided on the case 16 of the main body 12 and which are engageable with the wire 64. Therefore, the installation/removal structure can be simplified. Namely, the wire 64, which is used for operation, functions not only as the operating means but also as the engaged means. Therefore, the number of parts can be reduced as compared with a structure in which these functions are performed by separate parts, and the installation/removal structure can be simplified. The same may be said of the installation/removal structure of the FDD pack 42 in the present embodiment.

Accordingly, in the present embodiment, the space occupied by parts within the case 16 of the main body 12 can be reduced. As a result of the simplification of the structure and the reduction in space occupied by parts, which are due to the decrease in the number of parts, the notebook-type personal computer 10 can be made more thin and more light-weight.

Moreover, in the installation/removal structure of the HDD pack 38 of the present embodiment, in the state in which the wire 64 is engaged with the engaging projections 72, 74, the position at which the engaged portion 64 is engaged with the engaging portions 72B, 74B is set slightly lower than the center of swinging of the wire 64 (the axial center of the supporting protrusions 62) (see FIG. 2). As a result, in the state in which the HDD pack 38 is installed, when an unexpected external force is applied in the direction of removing the HDD pack 38 (i.e., upwardly), the external force can be converted into force in the direction (encroaching direction) of engaging the engaged portion 64B of the wire 64 with the engaging portions 72B, 74B of the engaging projections 72, 74. Accordingly, even at the time when such an external force is applied, the HDD pack 38 is not inadvertently removed from the case 16 of the main body 12. Further, in the present embodiment, in the state in which the HDD pack 38 is installed, the tip end portions of the pair of positioning projections 60 abut the pair of engaging projections 72, 74. Therefore, elastic deformation of the supporting portions 72A, 74A of the engaging projections 72, 74 by the above-mentioned converted force can be prevented by the positioning projections 60. As a result, inadvertent removal of the HDD pack 38 when an external force is applied can be prevented even more reliably.

In the present embodiment, the present invention is applied to the HDD pack 38 and the FDD pack 42, which require a reliable installation/removal structure. However, the present invention is not limited to the same and may also be applied to the battery pack 40. Further, the present invention is applicable to devices other than the above packs.

In the present embodiment, the notebook-type personal computer 10 is used as an example of an information processing apparatus. The present invention, however, is not limited to the same and may be applied to a laptop-type personal computer, a desktop-type personal computer or other various information processing apparatuses.

Moreover, in the present embodiment, in the installation/removal structure for the HDD pack 38, the engaging projections 72, 74 elastically deform, and in the installation/removal structure of the FDD pack 42, the wire 78 elastically deforms. The present invention, however, is not limited to the same, and a structure in which both a swinging means and an engaging means elastically deform is possible.

In the present embodiment, the engaging projections 72, 74 elastically deform in the installation/removal structure for the HDD pack 38, and the wire 78 elastically deforms in the installation/removal structure for the FDD pack 42. The installation/removal structures, however, may be structured such that neither the swinging means nor the engaging means is elastically deformed. For example, in the installation/removal structure for the FDD pack 42 of the present embodiment, the axially supported portions 78B of the wire 78 are structured so as to be axially supported directly at the axial supporting holes of the pair of flanges 81 of the FDD pack 42. A structure may be used in which the diameters of the axial supporting holes of the flanges 81 are greater than the diameter of the wire 78 and drum-shaped resin bushes are fit so as to be attached. The axially supported portions 78B of the wire 78 are axially supported at the axially central portions of the resin bushes. In this case, when the engaged portion 78C of the wire 78 clears the jaw portion 84A of the engaging convex portion 84, the engaged portion 78C of the wire 78 does not elastically deform. Due to the elastic deformation of the resin bushes, the engaged portion 78C of the wire 78 is made to withdraw when the jaw portion 84C interferes with the engaged portion 78C.

The structures of the swinging means and the engaging means are not limited to those in the above-described embodiment, and a variety of structures are possible. For example, an arm made of resin (e.g., a rod member having spherical tip end portion) may be used as the swinging means, and a clamp which elastically nips the rod member may be used as the engaging means.

Further, a single structure may be used for the installation/removal structure of the HDD pack 38 (the structure provided with the engaging projections 72, 74) and the installation/removal structure of the FDD pack 42 (provided with the engaging convex portion 84). For example, adding the engaging projections 72, 74 for the HDD pack 38 to the engaging convex portion 84 for the FDD pack 42 results in the structure illustrated in FIGS. 10 and 11. In this case, the configuration of the wire 78 must be changed slightly so that the wire 78 engages with the engaging projections 72, 74 as well.

While the invention has been particularly shown and described with reference to a preferred embodiment, it will be understood by those skilled in the art that various changes in form and detail may be made therein without departing from the spirit and scope of the invention.

We claim:

1. An installation/removal structure for use with a generally rectangular peripheral device which may be temporarily installed within a portable data processing system, said installation/removal structure comprising:

an engagement means provided within an interior portion of said portable data processing system;

an electrical connector disposed within said interior portion of said portable data processing system proximate to said engagement means for electrically engaging said generally rectangular peripheral device with said portable data processing; and an elongate wire bail swingably mounted across one end of said generally rectangular peripheral device, said elongate wire bail for engaging with said engagement means by swinging to a first position such that said generally rectangular peripheral device is held in electrical engagement with said electrical connector and for disengaging from said engagement means in response to a swinging thereof such that said generally rectangular peripheral device may be removed from said interior portion of said portable data processing system.

2. The installation/removal structure according to claim 1 further including at least one tape mounted to said elongate wire bail for facilitating gripping of said elongate wire bail for rotation thereof.

3. The installation/removal structure according to claim 1 wherein said elongate wire bail is flexible and wherein said elongate wire bail engages said engagement means in response to a deformation thereof.

* * * * *